Patented Jan. 20, 1931

1,789,565

UNITED STATES PATENT OFFICE

ALBERT P. SACHS, OF NEW YORK, N. Y., ASSIGNOR TO THE LARVEX CORPORATION, OF NEW YORK, N. Y., A CORPORATION OF NEW YORK

INSECTICIDE

No Drawing.   Application filed July 18, 1923.   Serial No. 652,453.

This invention relates to insecticides and has particular reference to compositions of matter calculated for use in the destruction of insects, such as moths and moth larvæ. Among the objects of the invention is to provide a composition of matter that is peculiarly poisonous and destructive for insects but which is relatively harmless to the higher orders of animal life especially the vertebrates.

Another object of the invention is to provide a composition of matter for use on or in connection with fabrics or articles of clothing and having the peculiar property of rendering such fabrics or articles of clothing permanently mothproof or practically so, the fabrics after having been impregnated or treated with the composition being possessed of the characteristic of being immune from the ravages of moths or moth larvæ practically indefinitely.

A still further object of the invention is to provide a composition of matter possessed of certain extracts in connection with certain anhydrous material, the property of the latter being to absorb the water of crystallization of the extracts to produce a dry powder, one that will remain in its powdered or pulverulent form for convenience of handling, shipping, and storage as long as desired or until it is to be put into the form of a solution, a form best suited for application to the fabrics.

With the foregoing and other objects in view the invention consists in certain details of composition and steps of operation hereinafter more specifically recited and particularly claimed.

In carrying out the spirit of this invention in a practical form and yet without intending to be restricted to all the specific elements of the composition or proportions recited, I employ in the composition three types of ingredients: (1) An essential element or item, one that is known to have a peculiarly destructive or poisonous action upon the type of insects mentioned particularly herein; (2) auxiliary elements or ingredients, composed of bitter and astringent principles, the effects of which is known to be destructive of the insects, the action being well known and well proved but without being aware at the present time of the precise scientific reason for such action, and (3) a mechanical agent of an anhydrous form or composition calculated to absorb the water of crystallization from the other commodities so as to produce and maintain the composition in powdered form.

For the essential component above referred to I have used with pronounced success and efficiency sodium fluoride, a substance that is peculiarly and specifically poisonous and destructive of moths and similar insects. For the auxiliary components I employ an extract of bitter aloes and an extract of quassia, both of which extracts are possessed of bitter and astringent principles. The anhydrous material employed by me is preferably sodium sulphate.

The manner of preparing the extracts above specified is preferably as follows: An extract of bitter aloes prepared by boiling, for example, 100 grams of Curacao bitter aloes with 4 liters of water and filtering. The extract of quassia is prepared in a somewhat similar manner by boiling 100 grams of solid extract of quassia in one-half liter of water and filtering.

The fluid extracts prepared as stated are compounded with the essential and auxiliary components in substantially the following proportions: 800 cc. of the extracts, namely, 300 cc. of the bitter aloes and 500 cc. of the quassia, are mixed with four pounds sodium fluoride and two pounds of anhydrous sodium sulphate. As above premised the sulphate in the form stated absorbs the water of crystallization from the other components, forming a dry powder for the composition, which may be shipped, stored, or handled in such form with maximum convenience and minimum expense. When the composition is to be used it preferably is made into a solution and sprayed as a mist or fog upon the fabrics, thoroughly impregnating the fibers thereof.

I claim:

1. The herein described insecticide, comprising as components an inorganic salt having a destructive and poisonous action upon moths and similar insects but practically harmless to vertebrates, a bitter vegetable extractive substance and an anhydrous material capable of absorbing water of crystallization from the first mentioned components, whereby the composition is produced in powdered form.

2. A composition of matter as set forth in claim 1 in which the poisonous component is sodium fluoride.

3. A composition of matter as set forth in claim 1 in which the extract component includes bitter aloes and quassia.

4. A composition of matter as set forth in claim 1 in which the bitter extract includes a certain portion of bitter aloes.

5. A composition of matter as set forth in claim 1 in which the bitter and astringent component comprises extracts of bitter aloes and quassia in the proportion of three of the former to five of the latter.

6. The herein described insecticide comprising a composition including sodium fluoride, anhydrous sodium sulphate, and bitter and astringent material, substantially in the proportion of four pounds of sodium fluoride, two pounds of sodium sulphate, and 800 cc. of bitter and astringent material.

7. A composition of matter as set forth in claim 6 in which the bitter and astringent material comprises 300 cc. extract of bitter aloes and 500 cc. extract of quassia.

8. A moth proofed textile material treated with sodium sulphate and sodium fluoride in solution.

9. Moth proofed textile materials treated with sodium sulphate, sodium fluoride and a bitter vegetable extract in solution.

10. A composition for moth-proofing textile materials, including sodium sulphate and sodium fluoride in solution.

11. A composition for moth-proofing textile materials, composed of sodium sulphate, sodium fluoride and a bitter extract in solution.

12. The process of moth proofing wool, which consists in subjecting the wool to the action of water, quassia extract, sodium sulphate, sodium fluoride and bitter aloes.

13. A composition of matter as set forth in claim 1 in which the bitter and astringent component includes an extract of quassia.

In testimony whereof I affix my signature.

ALBERT P. SACHS.